United States Patent
Hirakawa

(10) Patent No.: US 9,620,099 B2
(45) Date of Patent: Apr. 11, 2017

(54) ULTRASONIC TRANSDUCER DEVICE AND METHOD OF ATTACHING THE SAME

(71) Applicant: PANASONIC CORPORATION, Osaka (JP)

(72) Inventor: Osamu Hirakawa, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 337 days.

(21) Appl. No.: 14/284,554

(22) Filed: May 22, 2014

(65) Prior Publication Data
US 2014/0347959 A1 Nov. 27, 2014

(30) Foreign Application Priority Data
May 23, 2013 (JP) ................. 2013-109372

(51) Int. Cl.
G10K 11/00 (2006.01)
G01S 7/521 (2006.01)
G01S 15/93 (2006.01)

(52) U.S. Cl.
CPC ............ *G10K 11/004* (2013.01); *G01S 7/521* (2013.01); *G01S 15/931* (2013.01); *G01S 2015/938* (2013.01); *Y10T 29/49005* (2015.01)

(58) Field of Classification Search
CPC ...... G10K 11/00; G10K 11/35; G10K 11/004; B60Q 1/0441; B60Q 1/0475; B60Q 1/045; B60R 19/483
See application file for complete search history.

(56) References Cited

U.S. PATENT DOCUMENTS

| 6,203,366 B1* | 3/2001 | Muller | B29C 65/606 |
| | | | 439/561 |
| 2006/0022844 A1 | 2/2006 | Kawashima | |
| 2007/0062292 A1* | 3/2007 | Sato | B60R 19/483 |
| | | | 73/649 |

(Continued)

FOREIGN PATENT DOCUMENTS

| JP | 2011-053021 A | 3/2011 |
| WO | 98-52067 A2 | 11/1998 |

OTHER PUBLICATIONS

Extended European Search Report issued in European Application No. 14169442.2, dated May 11, 2015.

*Primary Examiner* — Luke Ratcliffe
*Assistant Examiner* — Hovhannes Baghdasaryan
(74) *Attorney, Agent, or Firm* — McDermott Will & Emery LLP

(57) ABSTRACT

The ultrasonic transducer device in accordance with the present invention includes a body unit and a fixing member. The body unit includes a housing including a space which is in a front surface of the housing and is for receiving an ultrasonic transducer, and a clip part provided to a side surface of the housing. The fixing member includes a fixing plate including a fixing surface to be attached to a rear surface of an exterior panel of a vehicle, and a through hole to communicate to an opening in the exterior panel, and an interlocked part removably connected to the clip part so that the space faces the through hole. The clip part includes an interlocking part, and a spring part keeping the interlocking part in a position in which the interlocking part is physically connected to the interlocked part.

10 Claims, 10 Drawing Sheets

(56) References Cited

U.S. PATENT DOCUMENTS

| | | |
|---|---|---|
| 2007/0220981 A1 | 9/2007 | Nakajima et al. |
| 2008/0184802 A1* | 8/2008 | Sato .................. G01S 7/521 |
| | | 73/632 |
| 2011/0242942 A1* | 10/2011 | Tsuzuki .............. G01S 7/521 |
| | | 367/121 |
| 2013/0250732 A1 | 9/2013 | Tsuji et al. |

* cited by examiner

ULTRASONIC TRANSDUCER DEVICE AND METHOD OF ATTACHING THE SAME

CROSS-REFERENCE TO RELATED APPLICATIONS

The application is based upon and claims the benefit of priority from Japanese Patent Application No. 2013-109372, filed on May 23, 2013, the entire contents of which are incorporated herein by reference.

TECHNICAL FIELD

The present invention relates to ultrasonic transducer devices and methods of attaching the same, and particularly to an ultrasonic transducer device to be attached to an external panel of a vehicle and a method of attaching the same.

BACKGROUND ART

In the past, there has been provided an ultrasonic transducer such as an ultrasonic speaker (ultrasonic transmitter) producing an ultrasonic wave and an ultrasonic microphone (ultrasonic receiver) receiving an ultrasonic wave. Further, in the past, there has been provided an ultrasonic sensor which detects an object by use of such an ultrasonic transducer. In other words, in the past, there has been provided an ultrasonic sensor to be attached to a bumper of a vehicle for the purpose of detecting an object near the vehicle (see document 1 [JP 2011-53021 A]).

The ultrasonic sensor disclosed in document 1 includes a bezel and a sensor body. The bezel is partially inserted into a fixing hole formed in a bumper from a front side of the bumper, and the sensor body is attached to the bezel on a rear side of the bumper. The bezel includes: a hollow-cylindrical body part which is to be inserted to the fixing hole; and a flange part which is extended from the periphery of the front end of the body to have a flange shape and is to be in contact with the vicinity of the fixing hole. The sensor body is attached to the bezel so that a front part of a housing accommodating an ultrasonic microphone is inserted into the body part from the rear side of the bumper. The ultrasonic sensor is configured such that the sensor body is to be attached to the bumper by means of the bezel.

In the aforementioned ultrasonic sensor, the flange part of the bezel is exposed on the front surface of the bumper. In a case where the bumper has the flat front surface, the flange part is visually distinguishable from the vicinity thereof. This is likely to cause deterioration of the appearance of the vehicle.

SUMMARY

In view of the above insufficiency, the present invention has aimed to propose an ultrasonic transducer device capable of reducing undesired effects on an appearance of a vehicle and a method of attaching the same.

The ultrasonic transducer device in accordance with one aspect of the present invention, includes a body unit and a fixing member. The body unit includes a housing, and at least one clip part. The housing includes a space which is in a front surface of the housing and is for receiving an ultrasonic transducer. The at least one clip part is provided to a side surface of the housing. The fixing member includes a fixing plate, and at least one interlocked part. The fixing plate includes a fixing surface to be attached to a rear surface of an exterior panel of a vehicle, and a through hole to communicate to an opening in the exterior panel. The at least one interlocked part is removably connected to the at least one clip part so that the space faces the through hole. The at least one clip part includes an interlocking part, and a spring part. The interlocking part is movable between a first position in which the interlocking part is physically connected to the at least one interlocked part and a second position in which the interlocking part is not physically connected to the at least one interlocked part. The spring part keeps the interlocking part in the first position.

The ultrasonic transducer device in accordance with another aspect of the present invention, includes a body unit and a holding member. The body unit includes a housing, and at least one clip part. The housing includes a space which is in a front surface of the housing and is for receiving an ultrasonic transducer. The at least one clip part is provided to a side surface of the housing. The holding member includes a flange, and at least one interlocked part. The flange includes a rear surface to be attached to a front surface of an exterior panel of a vehicle to be in a vicinity of an opening in the exterior panel, and a through hole to communicate to the opening. The at least one interlocked part is provided to a part of the rear surface of the flange exposed via the opening and is removably connected to the at least one clip part so that the space faces the through hole. The at least one clip part includes an interlocking part, and a spring part. The interlocking part is movable between a first position in which the interlocking part is physically connected to the at least one interlocked part and a second position in which the interlocking part is not physically connected to the at least one interlocked part. The spring part keeps the interlocking part in the first position.

The method of attaching an ultrasonic transducer device in accordance with another aspect of the present invention, includes: preparing the ultrasonic transducer device; attaching the fixing member of the ultrasonic transducer device to an a rear surface of an external panel of a vehicle in such a manner that the fixing surface is in surface contact with the rear surface; aligning the through hole of the fixing member with the space, and the at least one interlocked part with the at least one clip part; and moving the body unit toward the fixing member to connect the at least one interlocked part to the at least one clip part.

DETAILED DESCRIPTION

Figure 1:
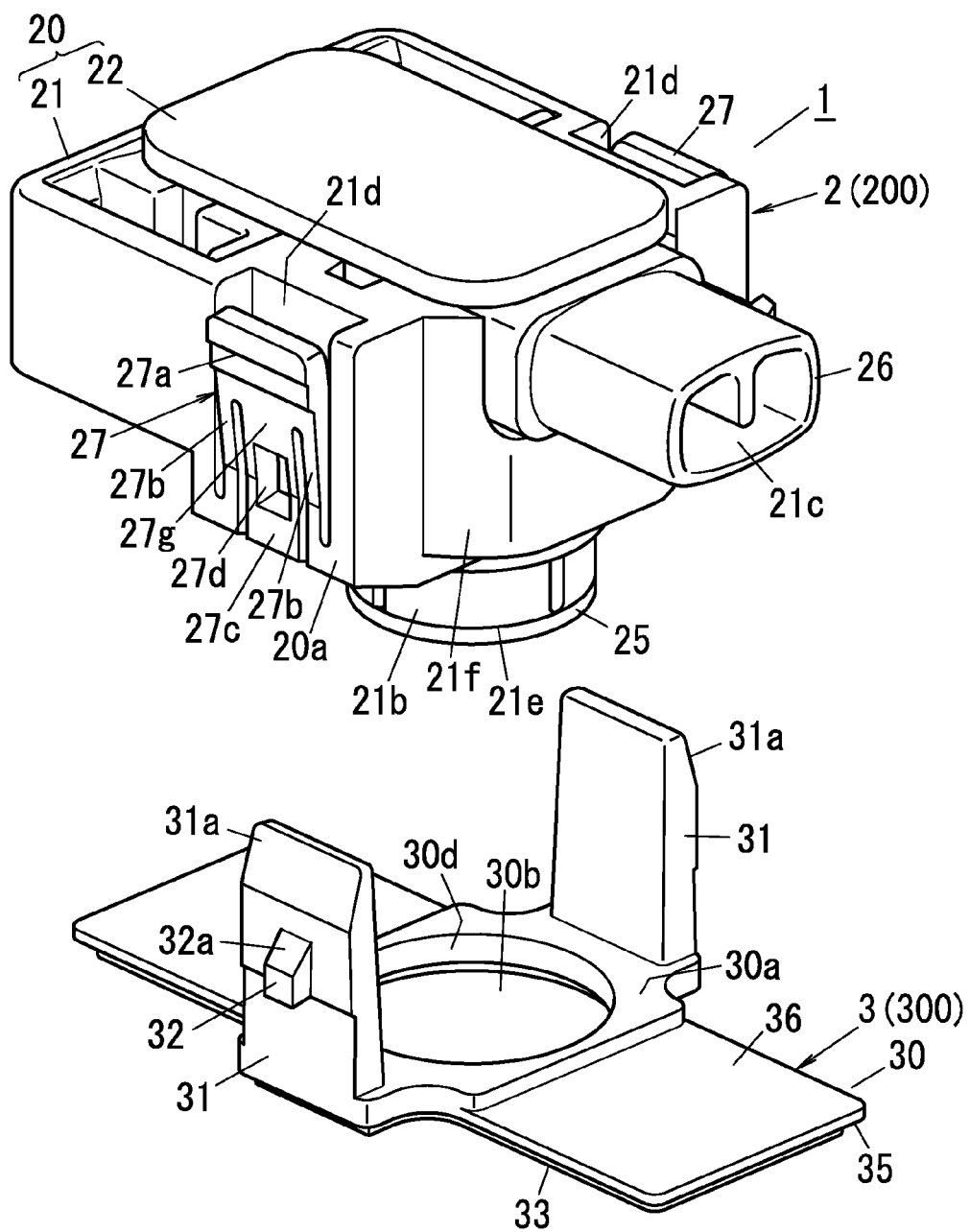
FIG. 1 is an exploded perspective view illustrating an ultrasonic sensor device (ultrasonic transducer device) of one embodiment in accordance with the present invention.

The ultrasonic transducer device 1 of one embodiment in accordance with the present invention is an electro-acoustic transducer which has a function of transmitting an ultrasonic wave and a function of receiving an ultrasonic wave. Thus, an ultrasonic wave produced by the ultrasonic transducer device 1 is sent outside. Further, an external ultrasonic wave is received by the ultrasonic transducer device 1.

The ultrasonic transducer device 1 of the present embodiment has the function of receiving an ultrasonic wave and therefore can be referred to as an ultrasonic sensor device. Note that, the ultrasonic transducer device 1 may have either the function of transmitting an ultrasonic wave or the function of receiving an ultrasonic wave.

The ultrasonic transducer device 1 of the present embodiment includes the body unit 2 (200) and the fixing member 3 (300).

The body unit 2 includes a housing 20, and two clip parts 27. The housing 20 includes a space 28 which is in a front surface 21e of the housing 20 and is for receiving an ultrasonic transducer (transducer block) 23. The two clip parts 27 are provided to side surfaces 21f of the housing 20.

The fixing member 3 includes a fixing plate 30, and two interlocked parts 31. The fixing plate 30 includes a fixing surface (face) 35 to be attached to a rear surface 501 of an exterior panel (bumper 50) of a vehicle, and a through hole 30b to communicate to an opening 51 in the exterior panel 50. The two interlocked parts 31 are removably connected to the two clip parts 27 individually so that the space 28 faces the through hole 30b. Note that, the rear surface 501 of the bumper 50 constitutes part of an internal (inside) surface of a body the vehicle. Therefore, hereinafter, the rear surface 501 of the body 50 is also referred to as an internal surface of the bumper 50.

Each clip part 27 includes an interlocking part 27c, and a spring part 27b. The interlocking part 27c is movable between a first position in which the interlocking part 27c is physically connected to the corresponding interlocked part 31 and a second position in which the interlocking part 27c is not physically connected to the corresponding interlocked part 31. The spring part 27b keeps the interlocking part 27c in the first position.

The ultrasonic transducer device 1 of the present embodiment is described in more detail below. As shown in FIGS. 1 to 4, the ultrasonic transducer device (hereinafter also referred to as ultrasonic sensor device) 1 of the present embodiment includes the body unit (sensor unit) 2 and the fixing member 3.

The ultrasonic sensor device 1 is to be attached to a rear side of an exterior panel (bumper or grille) of a vehicle, for example, and is used for detecting an obstacle in a vicinity of the vehicle.

Unless otherwise noted, in the following explanations, upward, downward, left and right directions of the ultrasonic sensor device are defined based on a direction of the ultrasonic sensor device in FIG. 4. However, the above definition of directions is merely used for simplifying the explanations and a direction in which the ultrasonic sensor device 1 is fixed is not limited to the aforementioned direction of the ultrasonic sensor device shown in FIG. 4.

Figure 2:
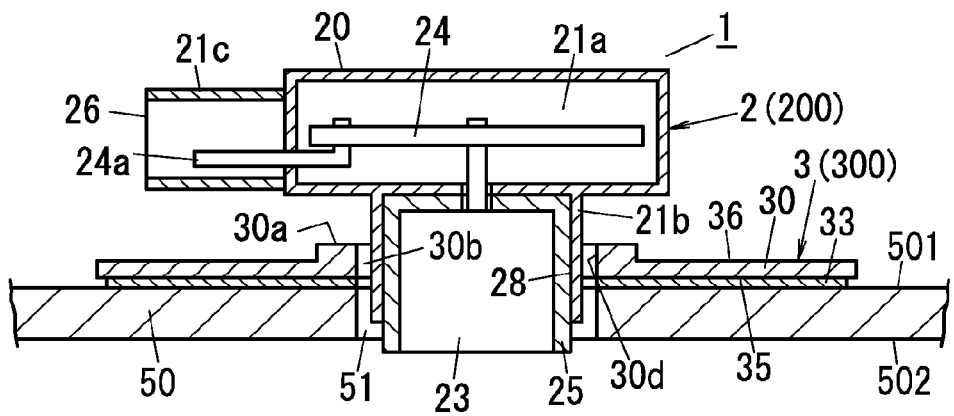
FIG. 2 is a sectional view illustrating the structure in which the ultrasonic sensor device of the above embodiment is attached to an exterior panel.

As shown in FIGS. 1 to 6, the sensor unit 2 includes the housing 20, and the transducer block (ultrasonic transducer) 23 and a circuit board 24 are accommodated in the housing 20 (see FIG. 2). The housing 20 is made of synthetic resin, for example.

The transducer block 23 includes a wave transmitter for transmitting an ultrasonic wave and a wave receiver for receiving a reflected wave caused by reflection of the ultrasonic wave at an object. In the present embodiment, one ultrasonic vibrator (not shown) used as the wave transmitter and the wave receiver, and the ultrasonic vibrator is accommodated in a cylindrical case.

The housing 20 includes a box-shaped body 21 having a recess 21a formed in an upper surface of the body 21 and a cover 22 attached to the upper surface of the body 21 so as to cover the recess 21a.

There is a hollow prism 21b that has a hollow-cylindrical shape and protrudes downward from the lower surface of the body 21. The transducer block 23 is accommodated in the hollow prism 21b so as to have a transmission wave face and a receiving wave face that face in the downward direction. In other words, the housing 20 includes the space 28 which is in the front surface 21e of the housing 20 and is for receiving the ultrasonic transducer (transducer block) 23.

There is a vibration-proof rubber 25 interposed between the internal surface of the hollow prism 21b and the transducer block 23 so as to attenuate vibration transmitted from the outside and vibration occurring at surfaces other than an apical surface of the transducer block 23 caused by transmission and reception of ultrasonic waves.

The circuit board 24 is accommodated in the recess 21a of the body 21. The circuit board 24 includes a circuit for activating the ultrasonic vibrator to transmit ultrasonic waves, a circuit for amplifying the output from the ultrasonic vibrator and extracting a received signal from the amplified output, and a circuit for judging whether an object exists in a vicinity of a vehicle on the basis of a time interval between the time of sending an ultrasonic wave and the time of receiving the reflected ultrasonic wave.

There are a plurality of pin terminals 24a for power supply and for signal output mounted on the circuit board 24. The plurality of pin terminals 24a protrude to be inside a hollow-prismatic part 21c provided to one side of the housing 20. The hollow-prismatic part 21c and the pin terminals 24a disposed therein constitute a connector 26.

When the connector 26 of the ultrasonic sensor device 1 is connected with a connector (not shown) of a cable connected to an electric circuit (not shown) in the vehicle, the circuits on the circuit board 24 and the electric circuit in the vehicle are electrically connected to each other. Thereby, electric power is supplied from the electric circuit in the vehicle to the circuits on the circuit board 24, and a detection signal is allowed to be outputted from the circuit board 24 to the electric circuit in the vehicle.

The body 21 is provided at opposite side surfaces 21f thereof with clip parts 27. Each of the clip parts 27 is to be detachably engaged with a part of the fixing member 3. Each clip part 27 is elastic and is integrally formed with the body 21. In short, the clip part 27 is provided to the side surface 21f of the housing 20.

The body 21 is provided, at a portion that is closer to the center of the body 21 than the clip part 27 is, with a slot 21d passing through the body 21 in an upward and downward direction. In other words, the body unit 2 includes the slot 21d that is between the interlocking part 27c and the housing 20 and is for receiving the interlocked part 31.

The clip part 27 includes an operation piece 27a, the spring parts (connecting pieces) 27b and the interlocking part (interlocking piece) 27c which are integrally formed with each other.

The operation piece 27a has a rectangular plate shape and is inclined in such a manner that the distance between the operation piece 27a and the side surface of the body 21 (the side surface 21f of the housing 2) becomes greater toward an upper end of the operation piece 27a than at a lower end of the operation piece 27a.

The connecting pieces 27b protrude downward from opposite ends of a lower edge of the operation piece 27a, respectively, and lower ends of the connecting pieces 27b are connected to the side surface of the body 21. Each connecting piece 27b is narrower in width than the operation piece 27a and thus is flexible. Especially, the spring part 27b connects an end (upper end, in the drawings) 27g of the interlocking part 27c far from the fixing plate 30 to an end (lower end, in the drawings) 20a of the housing 20 close to the fixing plate 30.

The interlocking piece 27c protrudes downward from a center of the lower edge of the operation piece 27a and is provided at a midst thereof with a hole 27d which is to receive a protrusion 32 of the fixing member 3.

The fixing member 3 is a molded product of synthetic resin and, as shown in FIGS. 1, and 8 to 10, includes the fixing plate 30. The fixing plate 30 has a shape of a rectangular plate. The fixing plate 30 is to be in surface contact with the internal surface (rear surface) 501 of the exterior panel 50 of the vehicle.

The fixing plate 30 includes a thick part 30a at a center thereof in a longitudinal direction of the fixing plate 30. The thick part 30a is greater in thickness than opposite sides of the fixing plate 30 in the longitudinal direction. A through hole 30b is formed in the thick part 30a. The through hole 30b is circular, and allows insertion of the hollow prism 21b therein.

Columnar parts (interlocked part) 31 protrude upward from opposite ends of the thick part 30a in a width direction of the fixing plate 30. Each columnar part 31 is rectangular. The width of each columnar part 31 is set to be smaller than that of the slot 21d such that the columnar part 31 is allowed to be inserted into the slot 21d. The thickness of each columnar part 31 is set to be slightly greater than the corresponding dimension of the slot 21d.

The columnar part 31 has a slope 31a at an upper part of an outside surface thereof. The slope 31a is inclined in such a manner that an upper portion thereof is positioned more inward (closer to the center of the fixing plate 30 in the width direction) than a lower end thereof. The protrusion 32 is situated at the external surface of the columnar part 31 to be under the slope 31a and is to be engaged with the hole 27d of the clip part 27.

The fixing member 3 is, for example, stuck on the internal surface 501 of the bumper 50 with double sided tape 33 put on the rear face (fixing surface) 35 of the fixing plate 30.

Figure 11:
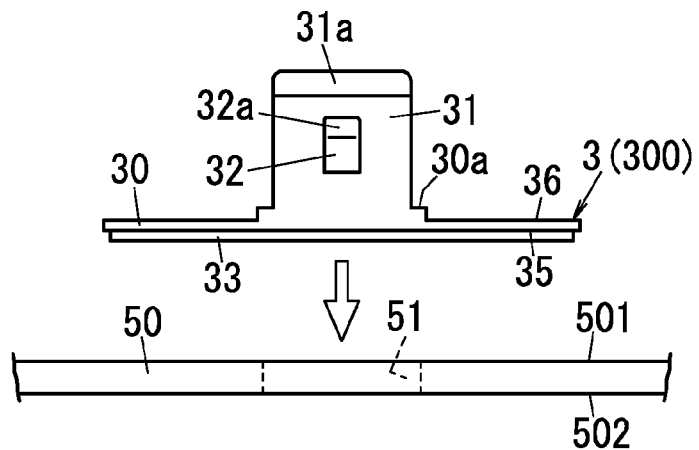
FIG. 11 is an explanatory view illustrating the process of attaching the ultrasonic sensor device to the rear surface of the bumper.
Figure 12:
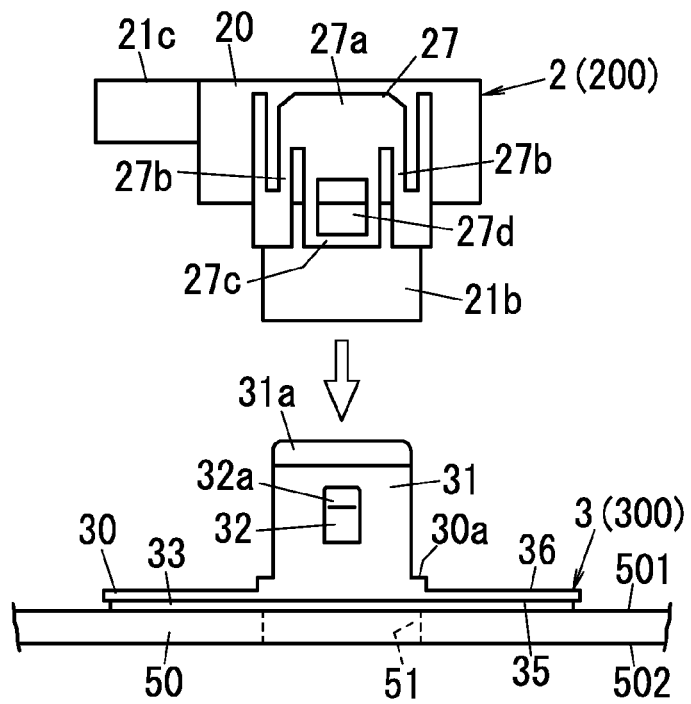
FIG. 12 is an explanatory view illustrating the process of attaching the ultrasonic sensor device to the rear surface of the bumper.
Figure 13:
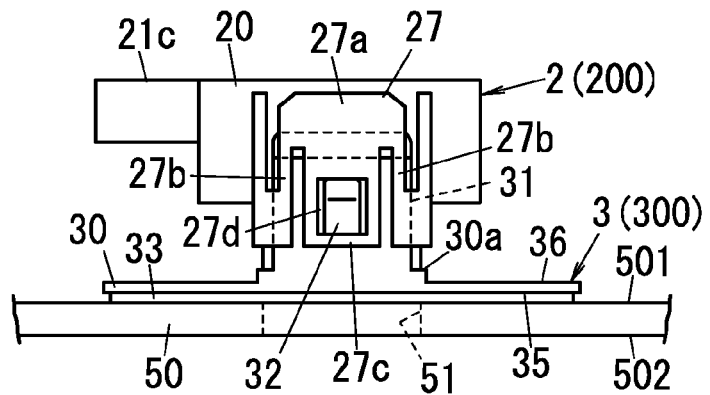
FIG. 13 is an explanatory view illustrating the process of attaching the ultrasonic sensor device to the rear surface of the bumper.

The ultrasonic sensor device 1 of the present embodiment has such a structure as mentioned above. The following explanations referring to FIGS. 11 to 13 are made to a process of attaching the ultrasonic sensor device 1 to the internal surface 501 of the bumper 50. Note that, as shown in FIG. 11, the bumper 50 has the hole (opening) 51 allowing insertion of the hollow prism 21b of the sensor unit 2 therein.

As shown in FIGS. 12 and 13, a worker aligns the bumper 50 (exterior panel) with the fixing member 3 such that the hole 51 in the bumper 50 and the through hole 30b are arranged concentrically, and thereafter sticks the fixing plate 30 on the internal surface 501 of the bumper 50 with the double sided tape 33.

Next, as shown in FIGS. 12 and 13, the worker aligns the clip part 27 of the sensor unit 2 with the columnar part 31 of the fixing member 3, and thereafter inserts the columnar part 31 into the slot 21d from below by moving the sensor unit 2 down toward the fixing member 3. When the sensor unit 2 is moved downward and eventually a lower end of the interlocking piece 27c is in contact with an upper end of the protrusion 32, the lower end of the interlocking piece 27c is displaced outward as a result of sliding along the slope 32a of the protrusion 32 and being on the protrusion 32.

When the worker further presses the sensor unit 2 downward, the whole of the protrusion 32 fits in the hole 27d of the interlocking piece 27c, and the interlocking piece 27c returns to its original position. Thereby, the protrusion 32 is engaged with the hole 27d. Thus, the interlocking part 27c is physically connected to the interlocked part 31 when the interlocked part 31 is inserted into the slot 21d. Accordingly, the opposite clip parts 27 hold the columnar parts 31 therebetween and, therefore, the sensor unit 2 is held by the fixing member 3, thereby the sensor unit 2 is fixed to the internal surface 501 of the bumper 50 by means of the fixing member 3.

In this regard, each connecting pieces 27b constitutes a spring part which causes an elastic force to keep the hole 27d of the interlocking piece 27c defined as the interlocking part in a position where the interlocking piece is engaged with the protrusion 32 (projection of the first interlocked part).

Note that, in the present embodiment, the hole 27d passing through the interlocking piece 27c is provided as the interlocking part having a recess shape. However, the recess shaped interlocking part to be engaged with the projection of the first interlocked part may not be required to pass through the interlocking piece 27c, i.e. may be a hole not penetrating through the interlocking piece.

While the sensor unit 2 is attached to the internal surface 501 of the bumper 50 via the fixing member 3, the hollow prism 21b of the sensor unit 2 is situated in the hole 51 of the bumper 50 and the edge surface of the transducer block 23 is exposed outside the bumper 50 through the hole 51. Therefore, the transducer block 23 is allowed to transmit an ultrasonic wave outside the vehicle and to receive a reflected wave caused by reflection of the ultrasonic wave at an object in a vicinity of the vehicle.

Note that a diameter of the through hole 30b is larger than that of the hole 51. When the fixing member 3 is attached to the bumper 50, there may be a position gap between the center of the hole 51 and that of the through hole 30b in some cases. However, the connecting pieces 27b can be changed in shape depending on the position gap between the hole 51 and the through hole 30b, and therefore the transducer block 23 can be attached to be aligned with the through hole 30b.

Dimensions of each part is set such that the end surface of the transducer block 23 is flush with the external surface 502 of the bumper 50 and accordingly the end surface of the transducer block 23 is unnoticeable. Note that such a state that the end surface of the transducer block 23 is flush with the external surface 502 of the bumper 50 is not limited to a state that there is no level difference between the end surface of the transducer block 23 and the external surface 502 of the bumper 50, but may include a state that there is a level difference between the end surface of the transducer block 23 and the external surface 502 of the bumper 50, unless a person being at a point distant from the vehicle can distinguish such a level difference.

It is also preferred that, the end surface of the transducer block 23 is colored in the same color as the external surface of the bumper (exterior panel of vehicle) 50 to which the ultrasonic sensor device 1 is to be attached. In this case, the transducer block is unnoticeable, thereby the appearance of the vehicle is improved.

Figure 14:
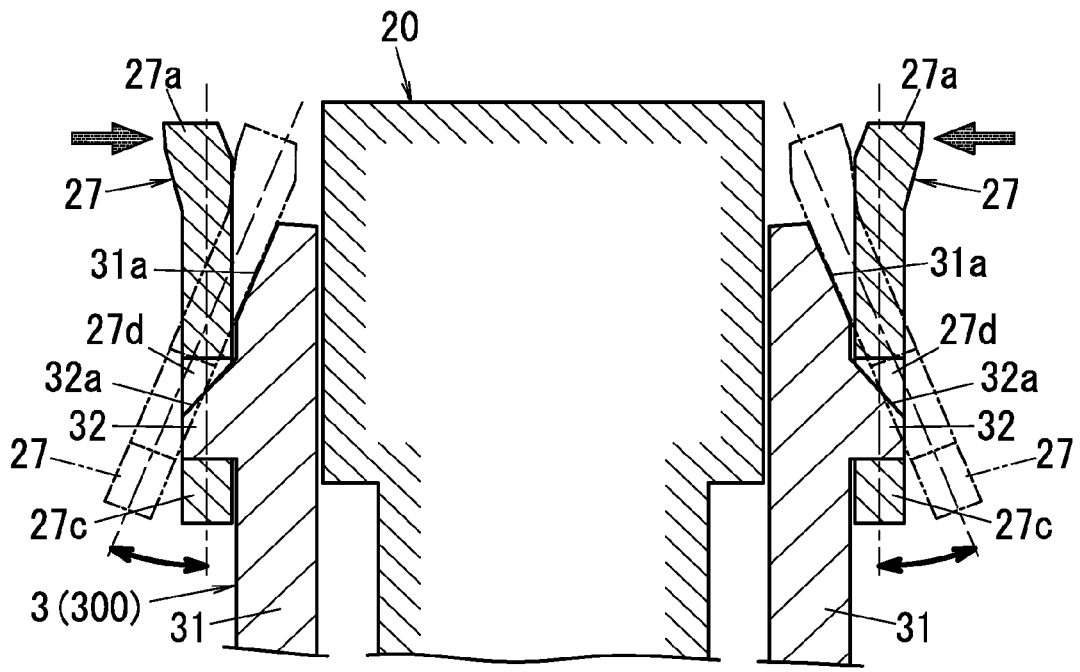
FIG. 14 is an explanatory view illustrating the process of detaching the sensor unit from the fixing member.

In a process of detaching the sensor unit 2 from the fixing member 3, first the worker holds the sensor unit 2 by the operation pieces 27a of the opposite clip parts 27. Thus, the interlocking pieces 27c turn around swing pivots defined by portions of the interlocking pieces 27c which are in contact with the bottom ends of the slopes 31a until the internal surfaces of the interlocking pieces 27c are in contact with the slopes 31a as shown in FIG. 14. As shown by dot lines in FIG. 14, when the interlocking pieces 27c turn until they are in surface contact with the slopes 31a, the lower ends of the interlocking pieces 27c move farther from the outside surfaces of the columnar parts 31 and accordingly the protrusions 32 go out of the holes 27d. In this state, when the worker picks up the sensor unit 2 while holding the sensor unit 2 by the operation pieces 27a, the worker can detach the sensor unit 2 from the fixing member 3. Also, the worker can easily replace the sensor unit 2.

As mentioned above, the ultrasonic sensor device 1 includes the sensor unit 2 including the wave transmitter for transmitting an ultrasonic wave and the wave receiver for receiving a reflected wave caused by reflection of the ultrasonic wave at an object, and the fixing member 3 which is to hold the sensor unit 2 and is to be attached to a vehicle. The sensor unit 2 includes the housing 20 to accommodate the wave transmitter and the wave receiver (the transducer block 23) and the at least one clip part 27 which is provided to the housing 20 and is configured to be detachably engaged with the at least one first interlocked part of the fixing member 3. The at least one clip part 27 includes the interlocking piece 27c (interlocking part) configured to be detachably engaged with the at least one first interlocked part (the columnar part 31), and the connecting piece 27b (spring part) to cause an elastic force to keep the interlocking piece 27c in a position where the interlocking piece 27c is engaged with the at least one first interlocked part. The fixing member 3 includes the fixing plate 30 to be fixed to the internal surface 501 of the exterior panel (e.g., the bumper 50) of the vehicle such that the fixing surface 35 of the fixing plate 30 is in surface contact with the internal surface 501. The at least one first interlocked part (the columnar part 31) is provided to the fixing plate 30. The fixing plate 30 includes the through hole 30b (first through hole) for exposing the wave transmitter and the wave receiver while the sensor unit 2 is fixed to the fixing member 3. The through hole 30b (first through hole) is positioned to be communicated with the hole 51 passing through the exterior panel 50. The sensor unit 2 is configured to be held by the fixing member 3 by engaging the interlocking piece 27c with the at least one first interlocked part (the columnar part 31) inside the exterior panel 50.

In this structure, only the wave transmitter and the wave receiver of the sensor unit 2 are exposed to the outside of the exterior panel 50 through the hole 51 passing through the exterior panel 50. Thereby, it is possible to obtain the ultrasonic sensor device capable of reducing undesired effects on an appearance of a vehicle.

A method of attaching the ultrasonic sensor device of the present embodiment includes steps of: attaching the fixing member 3 to the exterior panel 50 such that the fixing surface 35 is in surface contact with the internal surface 501 of the exterior panel 50; aligning the wave transmitter and the wave receiver with the through hole 30b (first through hole) of the fixing member 3 and aligning the at least one first interlocked part (the columnar part 31) with the at least one clip part 27; and moving the sensor unit 2 down toward the fixing member 3 to cause engagement of the at least one clip part 27 and the at least one first interlocked part (the columnar part 31).

In other words, the method of attaching an ultrasonic transducer device includes the following steps A to D. In the step A, the ultrasonic transducer device 1 is prepared. In the step B, the fixing member 3 of the ultrasonic transducer device 1 is attached to the rear surface 501 of the external panel 50 of the vehicle in such a manner that the fixing surface 35 is in surface contact with the rear surface 501. In the step C, the through hole 30b of the fixing member 3 is aligned with the space 28, and the interlocked part 31 is aligned with the clip part 27. In the step D, the body unit 2 is moved toward the fixing member 3 to connect the interlocked part 31 to the clip part 27.

In the structure obtained by this method, only the wave transmitter and the wave receiver of the sensor unit 2 are exposed to the outside of the exterior panel 50 through the hole 51 passing through the exterior panel 50. Thereby, it is possible to attach the ultrasonic sensor device 1 without causing the undesired effects on the front surface 502 of the exterior panel 50.

In the ultrasonic sensor device 1 of the present embodiment, it is also preferred that the at least one first interlocked part is the columnar part 31 which protrudes from a face (front face) 36 on the opposite side of the fixing plate 30 from the fixing surface 35 and is situated opposite the at least one clip part 27. In other words, the interlocked part 31 has the prismatic-shape and protrudes from the face 36 on the opposite side of the fixing plate 30 from the fixing surface 35. In this structure, it is possible to downsize the fixing member 3, comparing with such a structure where the at least one first interlocked part is a hollow-cylindrical part surrounding the sensor unit 2.

In the ultrasonic sensor device 1 of the present embodiment, it is also preferred that the sensor unit 2 includes a plurality of clip parts 27 and that each of the plurality of clip parts 27 is engaged with a corresponding one of the plurality of first interlocked parts (the columnar part 31). In other words, the body unit 2 includes the plurality of clip parts 27. The fixing member 3 includes the plurality of interlocked parts 31 individually corresponding to the plurality of clip parts 27. Each of the plurality of clip parts 27 is engaged with a corresponding one of the plurality of first interlocked parts (the columnar par 31) and accordingly engagement of the sensor unit 2 with the fixing member 3 is strengthened.

Figure 15:
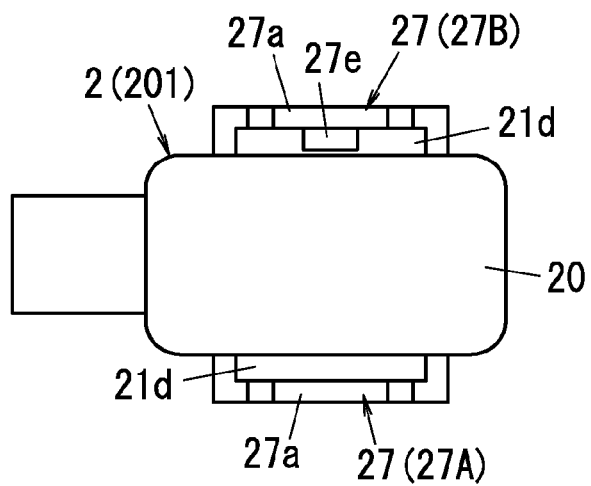
FIG. 15 is a top view illustrating the sensor unit.
Figure 16:
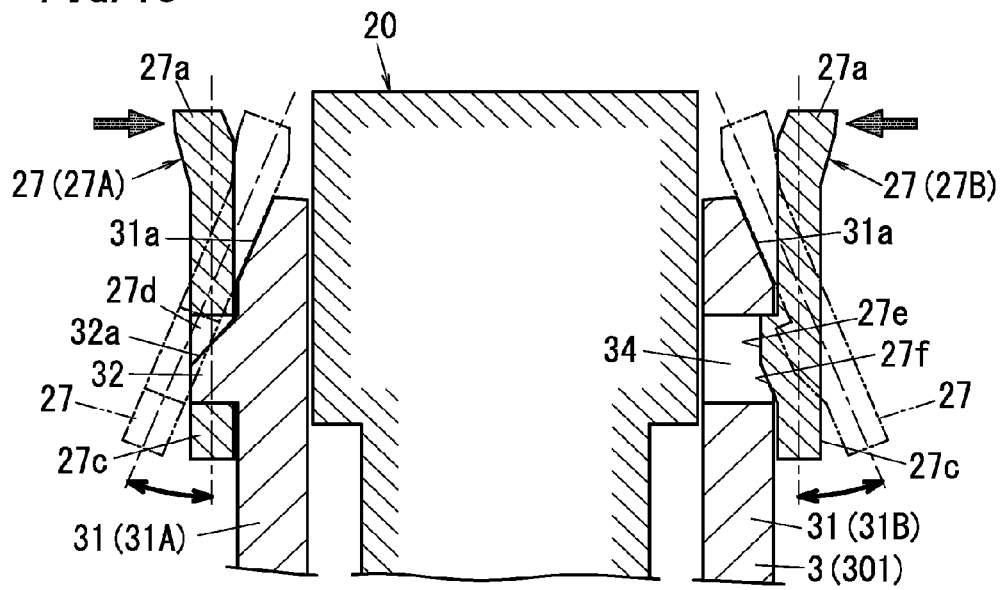
FIG. 16 is a sectional view illustrating the structure in which the sensor unit is attached to the fixing member.

As shown in FIGS. 15 and 16, it is also preferred that at least one clip part 27 (27A) provided to one of opposite sides of the housing 20 includes the hole 27d to be engaged with the protrusion 32 provided to the columnar part 31 (31A) and that at least one clip part 27 (27B) provided to the other of the opposite sides of the housing 20 includes a protrusion 27e to be engaged with a through hole 34 provided to the columnar part 31 (31B). Additionally the slope 27f is situated under the protrusion 27e, and the slope 27f is inclined in such a manner that an upper end is positioned more inward than a lower end.

In other words, with regard to the instance shown in FIGS. 15 and 16, the body unit 2 (201) include a recess-type clip part 27A and a protrusion-type clip part 27B that are on the opposite sides of the housing 20. Further, the fixing member 3 (301) includes a protrusion-type interlocked part 31A and a recess-type interlocked part 31B respectively corresponding to the recess-type clip part 27A and the protrusion-type clip part 27B. The protrusion-type interlocked part 31A includes the protrusion 32. The interlocking part 27c of the recess-type clip part 27A includes the recess 27d to receive the protrusion 32 of the protrusion-type interlocked part 31A. The interlocking part 27c of the protrusion-type clip part 27B includes the protrusion 27e. The recess-type interlocked part 31B includes the recess 34 to receive the protrusion 27e of the protrusion-type clip part 27B.

In the following explanations, when the opposite columnar parts should be distinguished, one of the columnar parts is referred to as the columnar part 31A and the other one is referred to as the columnar part 31B; whereas when the columnar parts need not be distinguished individually, they are referred to as the columnar parts 31. In the same way, when the clip parts on the opposite sides of the housing 20 should be distinguished, one of the clip parts is referred to as the clip part 27A and the other one is referred to as the clip part 27B; whereas when the clip parts need not be distinguished individually, they are referred to as the clip parts 27.

In order to attach the sensor unit 2 to the fixing member 3, a worker aligns the columnar parts 31 of the fixing member 3 with the clip parts 27 individually and thereafter inserts the columnar parts 31 into the slots 21d from below individually by moving the sensor unit 2 down toward the fixing member 3.

When the worker further moves the sensor unit 2 downward, the slope 32a of the protrusion 32 provided to the columnar part 31A is in contact with the lower end of the corresponding clip part 27A, and the upper end of the columnar part 31B is in contact with the slope 27f provided to the protrusion 27e of the corresponding clip part 27B.

When the worker further presses the sensor unit 2 downward, the lower end of the interlocking piece 27c to be engaged with the columnar part 31A slides along the slope 32a and is on the protrusion 32 and the columnar part 31B slides along the slope 27f and is on the protrusion 27e. Thereby the lower part of each of the clip parts 27 is changed in shape outward.

Thereafter, when the worker further presses the sensor unit 2 downward, the protrusion 32 of the columnar part 31A fits in the hole 27d of the corresponding interlocking piece 27c and the through hole 34 of the columnar part 31B receives the protrusion 27e of the corresponding interlocking piece 27c. When the protrusion 32 is fitted into the hole 27d and the protrusion 27e is fitted into the through hole 34, the opposite clip parts 27A and 27B return to their original shapes, and thereby the columnar parts 31 are engaged with the corresponding clip parts 27.

In this manner, the clip parts 27 hold the columnar parts 31 therebetween, and thereby the sensor unit 2 is held by the fixing member 3, and the sensor unit 2 is attached to the internal surface 501 of the bumper 50 by means of the fixing member 3.

As mentioned above, in the ultrasonic sensor device 1 of the present embodiment, the sensor unit 2 may include the plurality of clip parts 27 provided to opposite sides of the housing 20 and the fixing member 3 may include the plurality of the columnar parts 31 (first interlocked parts) individually corresponding to the plurality of clip parts 27 provided to the opposite sides of the housing 20. It is also preferred that the clip part 27A provided to the first side of the opposite sides of the housing 20 includes the interlocking part (the hole 27d of the interlocking piece 27c) having a recess shape to be engaged with the projection (the protrusion 32) provided to the corresponding columnar part 31A, and that the clip part 27B provided to the second side of the opposite sides of the housing 20 includes the interlocking part (the protrusion 27e of the interlocking piece 27c) having a projection shape to be engaged with the recess (the through hole 34) provided to the corresponding columnar part 31B.

In other words, the plurality of clip parts 27 include the recess-type clip part 27A and the protrusion-type clip part 27B that are on the opposite sides of the housing 20. The plurality of interlocked parts 31 include the protrusion-type interlocked part 31A and the recess-type interlocked part 31B respectively corresponding to the recess-type clip part 27A and the protrusion-type clip part 27B. The protrusion-type interlocked part 31A includes the protrusion 32. The interlocking part 27c of the recess-type clip part 27A includes the recess 27d to receive the protrusion 32 of the protrusion-type interlocked part 31A. The interlocking part 27c of the protrusion-type clip part 27B includes the protrusion 27e. The recess-type interlocked part 31B includes the recess 34 to receive the protrusion 27e of the protrusion-type clip part 27B.

According to this configuration, the clip part 27A is engaged with the columnar part 31A and the clip part 27B is engaged with the columnar part 31B, and thereby it is a direction in which the sensor unit 2 is attached to the fixing member 3 is specified. Hence, mistake in the direction of attachment of the sensor unit 2 can be reduced. Note that the interlocking part having a recess shape is not limited to the hole 27d passing through the interlocking piece 27c, but may be a hole not passing through the interlocking piece 27c.

As seen in the ultrasonic sensor device 1 of the present embodiment, it is also preferred that the columnar parts 31 defined as the first interlocked parts are positioned such that the columnar parts 31 are opposite each other while the housing 20 is between the columnar parts 31. By engagement of the columnar parts 31 and the clip parts 27 on the opposite sides of the housing 20, the fixing member 3 can hold the sensor unit 2 between opposite parts of the fixing member 3.

Figure 3:
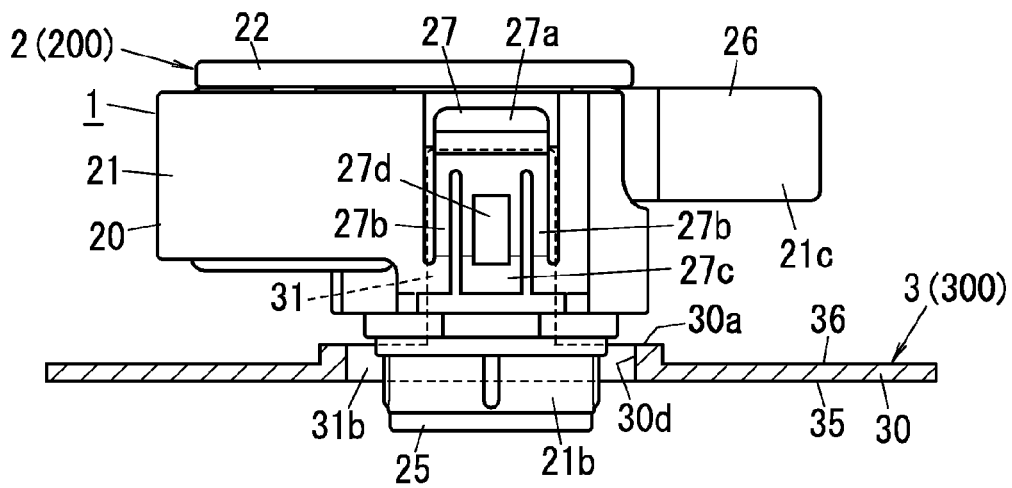
FIG. 3 is a side view illustrating the structure in which the ultrasonic sensor device is attached to the exterior panel.
Figure 4:
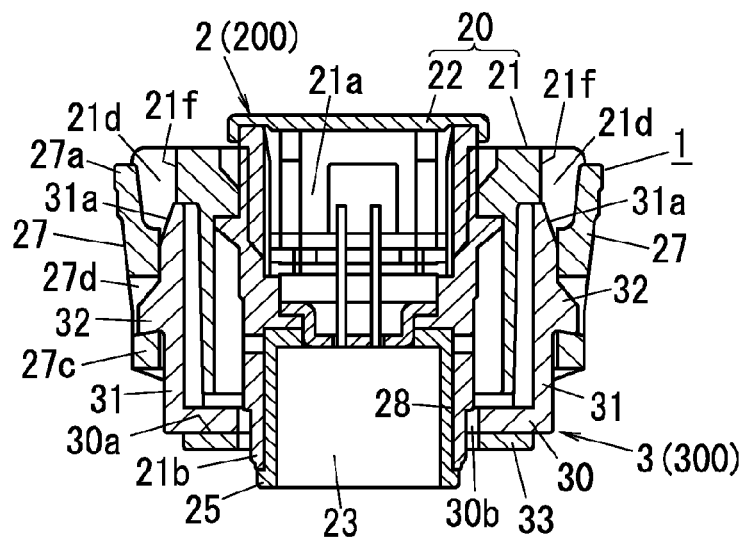
FIG. 4 is a sectional view illustrating the structure in which the ultrasonic sensor device is attached to the exterior panel, when viewed from the right side of the structure.
Figure 5:
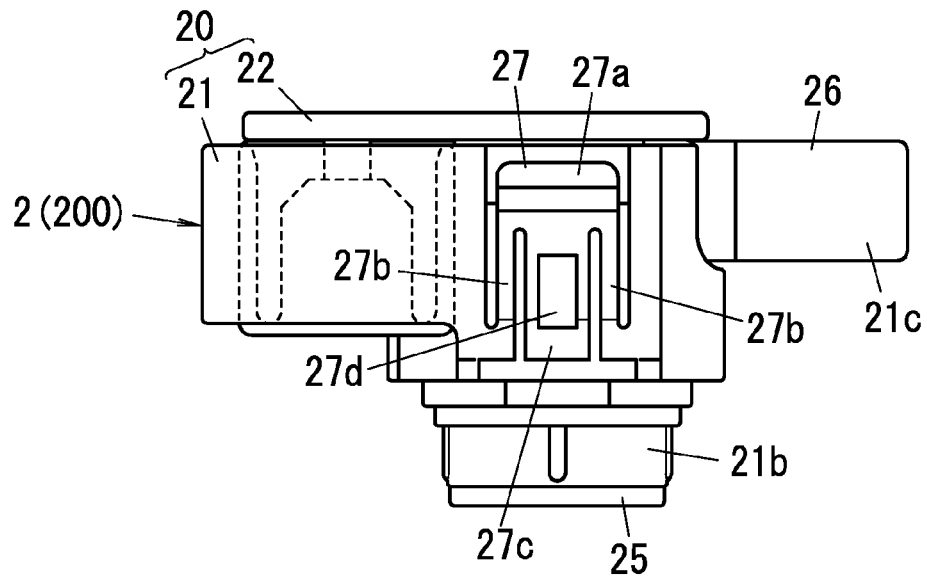
FIG. 5 is a side view illustrating the sensor unit of the ultrasonic sensor device.
Figure 6:
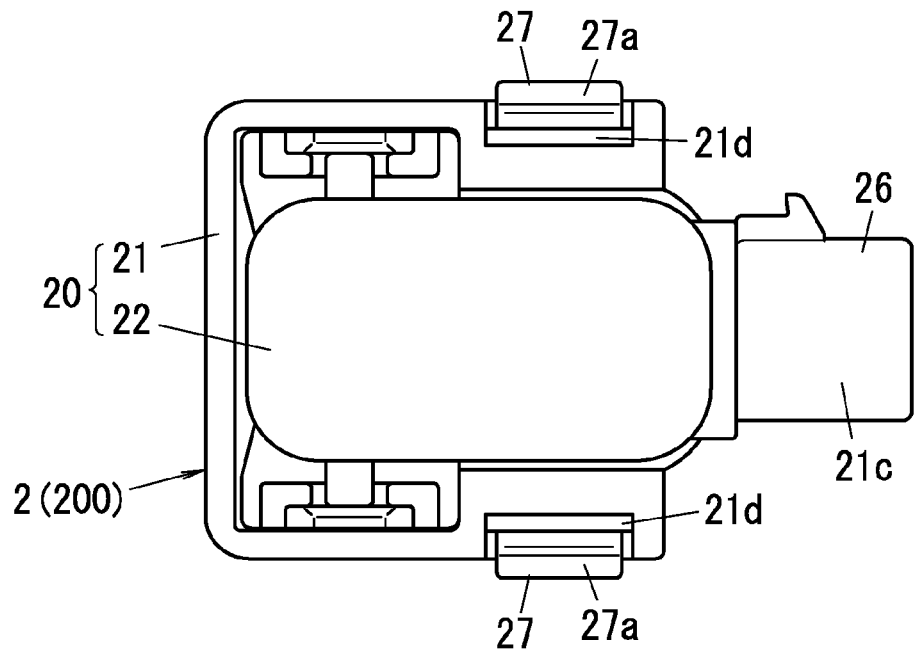
FIG. 6 is a top view illustrating the sensor unit.
Figure 7:
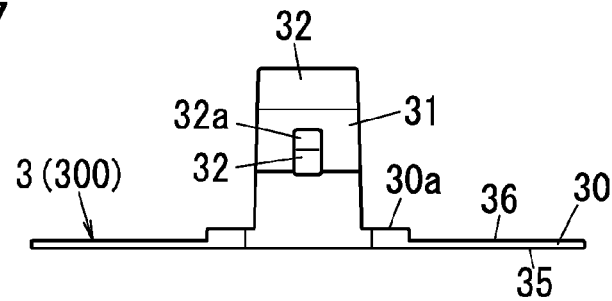
FIG. 7 is a side view illustrating the fixing member of the ultrasonic sensor device.
Figure 8:
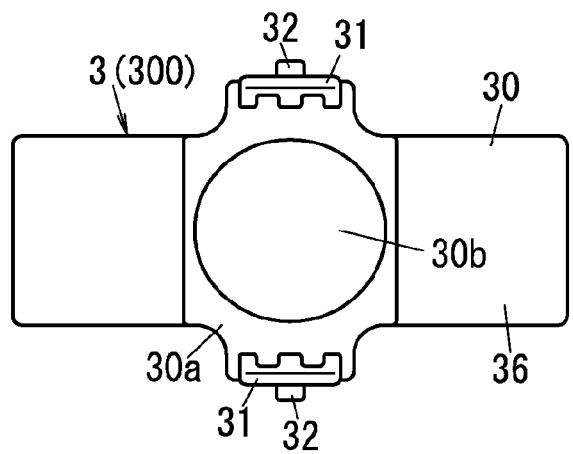
FIG. 8 is a top view illustrating the fixing member.
Figure 9:
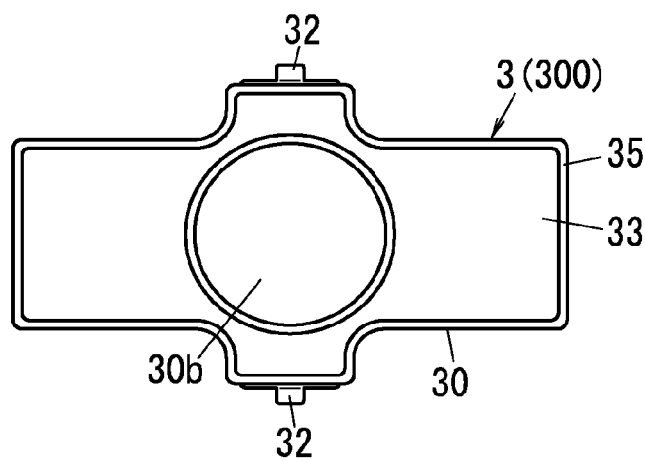
FIG. 9 is a bottom view illustrating the fixing member.
Figure 10:
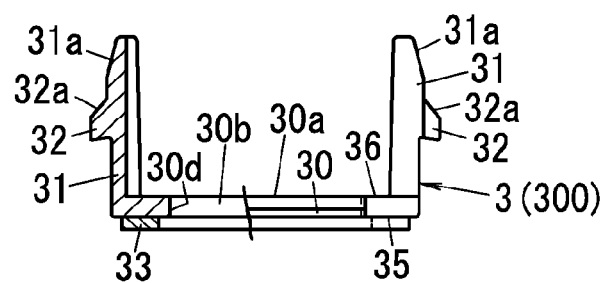
FIG. 10 is a partial sectional view illustrating the fixing member, when viewed from the right side of the fixing member.

In the ultrasonic sensor device 1 of the present embodiment, as shown in FIGS. 2 to 4, it is also preferred that the housing 20 is configured to, while the sensor unit 2 is attached to the fixing member 3, leave a gap between the portion (hollow prism) 21b of the housing 20 which is inserted into the through hole 30b (first through hole) of the fixing member 3 and the internal side surface 30d of the through hole 30b. In other words, the housing 20 includes the part (hollow prism) 21b positioned inside the through hole 30b. The fixing member 3 holds the body unit 2 so that the part 21b of the housing 20 is not in contact with the internal side surface 30d of the through hole 2. When the fixing member 3 is attached to the bumper 50, there may be a position gap between the center of the hole 51 and that of the through hole 30b in some cases. However, the connecting pieces 27b can be changed in shape depending on the position gap between the hole 51 and the through hole 30b, and therefore the transducer block 23 can be attached to be aligned with the through hole 30b.

Figure 17:
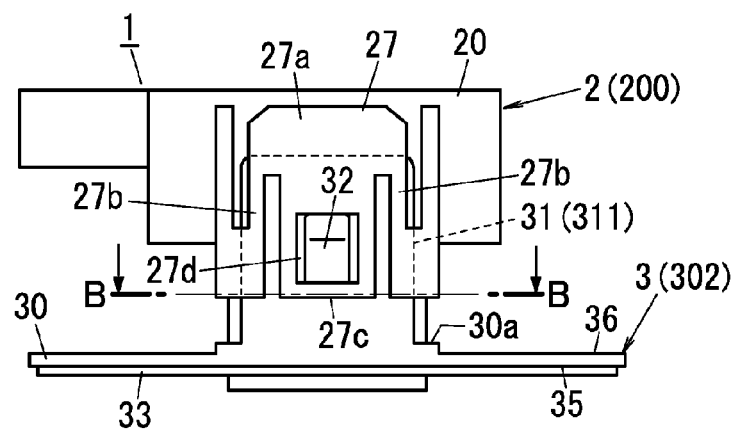
FIG. 17 is a side view illustrating the structure in which the sensor unit is attached to the fixing member.
Figure 18:
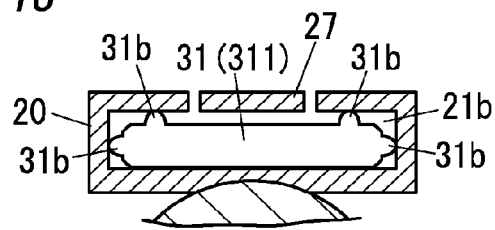
FIG. 18 is a sectional view on the line B-B of FIG. 17.

As shown in FIGS. 17 and 18, the columnar part 31 (311) to be inserted into the slot 21d of the housing 20 may be provided with ribs 31b for suppressing displacement of the housing 20 by being in contact with an internal side surface of the slot 21d. In other words, the fixing member 3 (302) shown in FIGS. 17 and 18 further includes the ribs 31b.

The fixing member 3 and the housing 20 are molded products of synthetic resin, and the synthetic resin used for the fixing member 3 is softer than the synthetic resin used for the housing 20. While the columnar part 31 is in the slot 21d, the rib 31b is pressed against the internal side surface of the slot 21d and thus shrank, and thereby an undesired movement of the housing 20 relative to the fixing member 3 is suppressed while the housing 20 is attached to the fixing member 3.

As mentioned above, in the ultrasonic sensor device 1 of the present embodiment, it is also preferred that the first interlocked part (the columnar part 31) is provided with the stopper (rib 31b) for suppressing displacement of the housing 20 by being in contact with the housing 20 while the interlocking part (the clip part 27) is engaged with the first interlocked part (the columnar part 31). In other words, the interlocked part 31 includes the stopper 31b to be in contact with the housing to prevent a displacement of the housing 20. Thereby, it is possible to suppress displacement of the interlocking part and the first interlocked part while the sensor unit 2 is attached to the fixing member 3.

Figure 19:
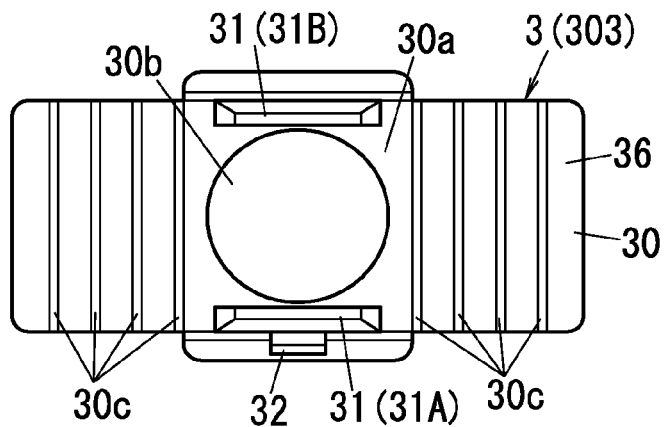
FIG. 19 is a plan view illustrating the fixing member.
Figure 20:
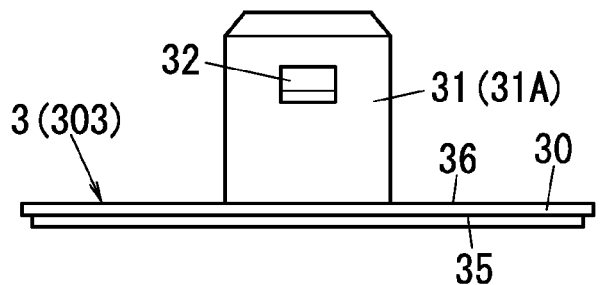
FIG. 20 is a side view illustrating the fixing member.
Figure 21:
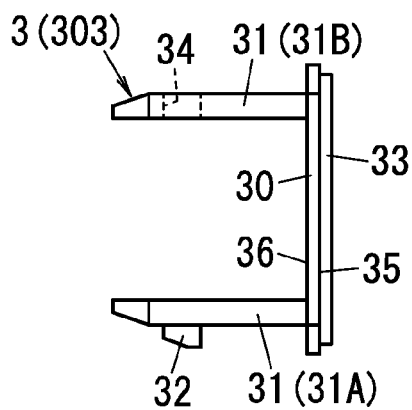
FIG. 21 is another plan view illustrating the fixing member.
Figure 22:
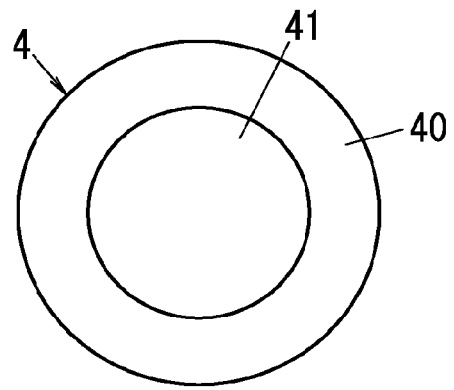
FIG. 22 is a front view illustrating the holding member for attaching the sensor unit to the external panel.
Figure 23:
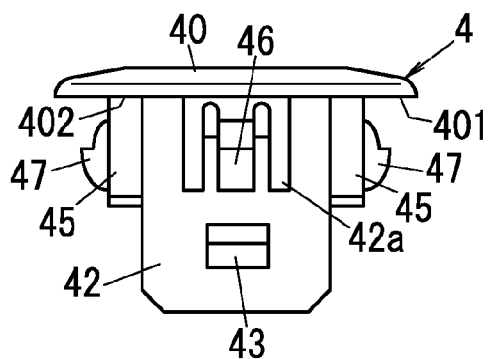
FIG. 23 is a bottom view illustrating the holding member.
Figure 24:
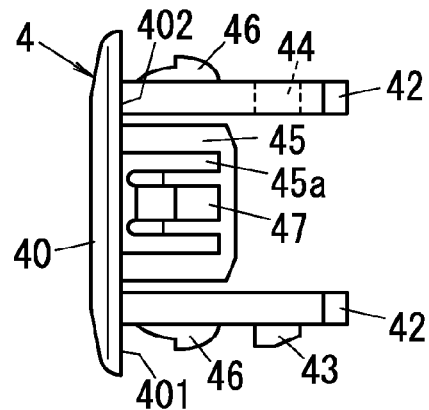
FIG. 24 is a side view illustrating the holding member, when viewed from the right side of the holding member.
Figure 25:
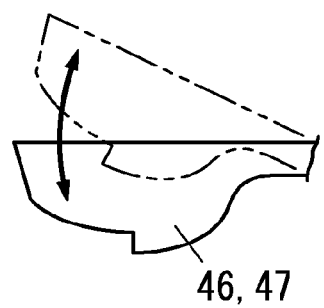
FIG. 25 is an enlarged view illustrating the primary part of the holding member.

As shown in FIGS. 19 to 21, there may be one or more grooves 30c in the surface (face 36) of the fixing plate 30 of the fixing member 3 (303). FIGS. 19 to 21 show an example where there are a plurality of grooves 30c extending in the width direction of the fixing plate 30 in the surface (face 36) of the fixing plate 30 in such a manner that the plurality of grooves 30c are arranged at even intervals in the longitudinal direction of the fixing plate 30.

Parts of the fixing plate 30 in which the grooves 30c are formed are thin and therefore the fixing plate 30 is flexible. Therefore, even when the exterior panel 50 of the vehicle to which the fixing member 3 is attached has a curved shape, the fixing plate 30 can be changed in shape according to the curved shape of the exterior panel 50 and thus it is possible to reduce a gap between the fixing member 3 and the rear surface 501 of the exterior panel 50.

Note that FIGS. 19 to 21 show the example where the grooves 30c are formed in the face 36 on the opposite side of the fixing plate 30 from the exterior panel 50. However, the grooves 30c may be formed in the face (fixing surface) 35 of the fixing plate 30 which faces the exterior panel 50 or may be formed in both the face 35 facing the exterior panel 50 and the face 36 on the opposite side from the exterior panel 50.

As mentioned above, in the ultrasonic sensor device 1 of the present embodiment, it is also preferred that the grooves 30c are formed in the surface of the fixing plate 30. In other words, the groove 30c is formed in the surface (face 35, 36) of the fixing plate 30. According to this configuration, the fixing plate 30 is easily changed in shape in accordance with the curved shape of the exterior panel 50 of the vehicle. Hence, it is possible to reduce a gap between the rear surface 501 of the exterior panel 50 and the fixing plate 30, and thus the fixing plate 30 can be fixed more firmly.

In the ultrasonic sensor device 1 of the present embodiment, the fixing member 3 is attached to the rear surface 501 of the exterior panel 50; however, as shown in FIGS. 22 to 28, the sensor unit 2 may be attached to a holding member 4 to be attached to the exterior panel 50 from the front side of the exterior panel 50.

The ultrasonic transducer device 1 shown in FIGS. 22 to 28 includes the body unit 2 (200) and the holding member 4.

The holding member 4 includes a flange 40 and two interlocked parts 42. The flange 40 includes a rear surface 401 to be attached to the front surface 502 of the exterior panel 50 of the vehicle to be in a vicinity of the opening 51 in the exterior panel 50, and a through hole 41 to communicate to the opening 51. Each interlocked part 42 is provided to a part 402 of the rear surface 401 of the flange 40 exposed via the opening 51. The two interlocked parts 42 are removably connected to the individual two clip parts so that the space 28 faces the through hole 41.

The holding member 4 is a molded product of synthetic resin. The holding member 4 has a disk shape and includes the flange 40 having the through hole 41 (second through hole) in the midst thereof. There are two columnar parts 42 (second interlocked parts) on the rear surface 401 of the flange 40. Each columnar part 42 has a rectangular shape. The columnar parts 42 are on opposite sides of the through hole 41 and are parallel to each other. The flange 40 is provided on the rear surface 401 thereof with two rectangular ribs 45. The ribs 45 are on the opposite sides of the through hole 41. The ribs 45 are parallel to each other and are perpendicular to the columnar parts 42.

One of the columnar parts 42 is provided with a protrusion 43 which is to be engaged with the hole 27d of the corresponding clip part 27, and the other of the columnar parts 42 is provided with a through hole 44 which is to be engaged with the protrusion 27e of the corresponding clip part 27.

Each of the columnar parts 42 is provided with an interlocking piece 46, and a U-shaped slit 42a is formed in a vicinity of the interlocking piece 46 so as to allow an end of the interlocking piece 46 close to the flange 40 to be flexible in a thickness direction of the interlocking piece 46. Similarly, each of the ribs 45 is provided with an interlocking piece 47, and a U-shaped slit 45a is formed in a vicinity of the interlocking piece 47 so as to allow an end of the interlocking piece 47 close to the flange 40 to be flexible in a thickness direction of the interlocking piece 47.

According to the ultrasonic sensor device 1 of the present embodiment, the sensor unit 2 can be attached to the exterior panel 50 by using the holding member 4 instead of the aforementioned fixing member 3. The following explanations referring to FIGS. 26 to 28 are made to a process of attaching the sensor unit 2 to the exterior panel 50 by using the holding member 4.

Figure 26:
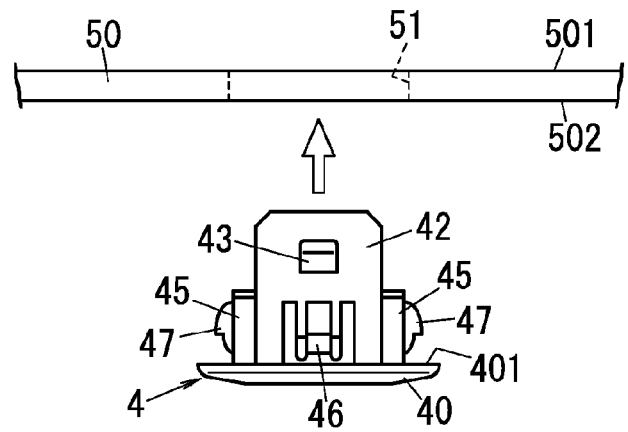
FIG. 26 is an explanatory view illustrating the process of attaching the sensor unit to the rear surface of the bumper by use of the holding member.
Figure 27:
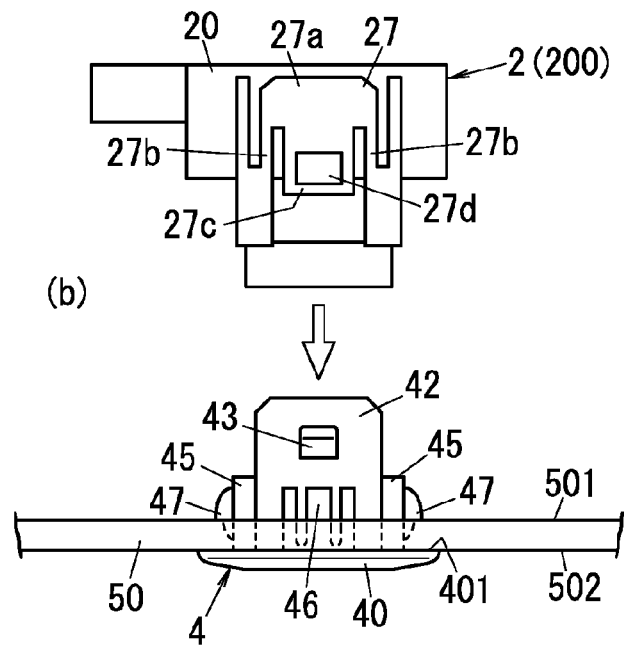
FIG. 27 is an explanatory view illustrating the process of attaching the sensor unit to the rear surface of the bumper by use of the holding member.

As shown in FIGS. 26 and 27, when a worker presses the holding member 4 against the bumper 50 (exterior panel) in such a manner that the columnar parts 42 and the ribs 45 are inserted into the hole 51 of the bumper 50 from the front side of the bumper 50, the interlocking pieces 46 and 47 come in contact with the internal side surface of the hole 51 and thus are displaced inward. When the worker further presses the holding member 4 against the bumper 50 until the rear surface 401 of the flange 40 is in contact with the external surface (front surface) 502 of the bumper 50, the interlocking pieces 46 and 47 emerge on the rear side of the bumper 50 and return to their original position. Thereby, the interlocking pieces 46 and 47 are in contact with the rear surface 501 of the bumper 50 and, accordingly, the holding member 4 is fixed to the bumper 50.

Figure 28:
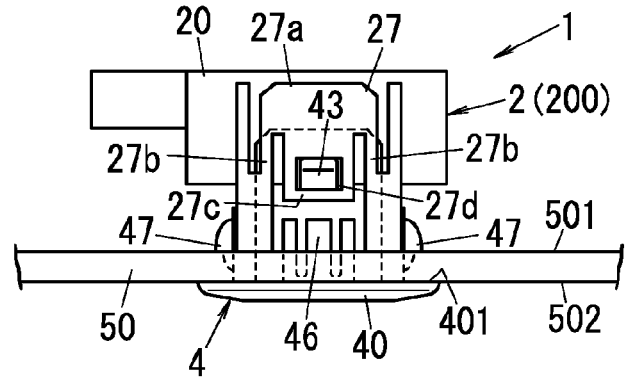
FIG. 28 is an explanatory view illustrating the process of attaching the sensor unit to the rear surface of the bumper by use of the holding member.

Next, as shown in FIGS. 27 and 28, the worker aligns the clip parts 27 of the sensor unit 2 with the columnar parts 42 of the holding member 4 and thereafter inserts the columnar parts 42 into the slots 21d from below respectively by moving the sensor unit 2 toward the holding member 4. When the sensor unit 2 reaches a predetermined position, the protrusion 43 of one columnar part 42 is engaged with the hole 27d of the corresponding clip part 27, and the through hole 44 of the other columnar part 42 is engaged with the protrusion 27e of the corresponding clip part 27. Thereby, the opposite clip parts 27 hold the columnar parts 42 therebetween. As a result, the sensor unit 2 is held by the holding member 4, and the sensor unit 2 is attached to the bumper 50 via the holding member 4.

As mentioned above, it is also preferred that the ultrasonic sensor device 1 of the present embodiment includes, instead of the fixing member 3, the holding member 4 which is to be attached to the bumper 50 serving as the exterior panel from the front side of the bumper 50. The holding member 4 includes: the flange 40 having the through hole 41 (second through hole) to communicate with the hole 51 passing through the bumper 50; and the columnar parts 42 (second interlocked parts) each protruding from the rear surface 401 of the flange 40 so as to go through the hole 51 of the bumper 50. The holding member 4 is configured to be attached to the external surface (front surface) 502 of the bumper 50 such that the rear surface 401 of the flange 40 is in contact with a periphery of the hole 51. The sensor unit 2 is configured to be attached to the bumper 50 by means of the holding member 4 by engaging the columnar part 42 of the holding member 4 with the clip part 27 while the wave transmitter and the wave receiver (constituted by transducer block 23) are exposed through the through hole 41 of the flange 40 attached to the external surface 502 of the bumper 50.

Therefore, it is possible to attach the sensor unit 2 to the exterior panel by using the holding member 4 which is to be attached to the exterior panel such as the bumper 50 from the front side.

As apparent from the embodiments described above, the ultrasonic transducer device 1 of the first aspect in accordance with the present invention, includes a body unit 2 and a fixing member 3. The body unit 2 includes a housing 20 and at least one clip part 27. The housing 20 includes a space 28 which is in a front surface 21e of the housing 20 and is for receiving an ultrasonic transducer (transducer block) 23.

The at least one clip part 27 is provided to a side surface 21f of the housing 20. The fixing member 3 includes a fixing plate 30 and at least one interlocked part 31. The fixing plate 30 includes a fixing surface 35 to be attached to a rear surface 501 of an exterior panel (bumper 50) of a vehicle, and a through hole 30b to communicate to an opening 51 in the exterior panel 50. The at least one interlocked part 31 is removably connected to the at least one clip part 27 so that the space 28 faces the through hole 30b. The at least one clip part 27 includes an interlocking part 27c and a spring part 27b. The interlocking part 27c is movable between a first position in which the interlocking part 27c is physically connected to the at least one interlocked part 31 and a second position in which the interlocking part 27c is not physically connected to the at least one interlocked part 31. The spring part 27b keeps the interlocking part 27c in the first position.

According to the ultrasonic transducer device 1 of the second aspect in accordance with the present invention, in addition to the first aspect, the at least one interlocked part 31 has a prismatic-shape and protrudes from a face 36 on an opposite side of the fixing plate 30 from the fixing surface 35.

According to the ultrasonic transducer device 1 of the third aspect in accordance with the present invention, in addition to the second aspect, the body unit 2 includes at least one slot 21d that is between the interlocking part 27c and the housing 20 and is for receiving the at least one interlocked part 31. The interlocking part 27c is physically connected to the at least one interlocked part 31 when the at least one interlocked part 31 is inserted into the at least one slot 21d.

According to the ultrasonic transducer device 1 of the fourth aspect in accordance with the present invention, in addition to the second or third aspect, the spring part 27b connects an end 27g of the interlocking part 27c far from the fixing plate 30 to an end 20a of the housing 20 close to the fixing plate 30.

According to the ultrasonic transducer device 1 of the fifth aspect in accordance with the present invention, in addition to any one of the second to fourth aspects, one of the interlocking part 27c and the at least one interlocked part 31 includes a protrusion (32, 27e), and the other of the interlocking part 27c and the at least one interlocked part 31 includes a recess (27d, 34) to receive the protrusion (32, 27e).

According to the ultrasonic transducer device 1 of the sixth aspect in accordance with the present invention, in addition to any one of the first to fourth aspects, the body unit 2 includes a plurality of clip parts 27. The fixing member 3 includes a plurality of interlocked parts 31 individually corresponding to the plurality of clip parts 27.

According to the ultrasonic transducer device 1 of the seventh aspect in accordance with the present invention, in addition to the sixth aspect, the plurality of clip parts 27 include a recess-type clip part 27A and a protrusion-type clip part 27B that are on opposite sides of the housing 20. The plurality of interlocked parts 31 include a protrusion-type interlocked part 31A and a recess-type interlocked part 31B respectively corresponding to the recess-type clip part 27A and the protrusion-type clip part 27B. The protrusion-type interlocked part 31A includes a protrusion 32. The interlocking part 27c of the recess-type clip part 27A includes a recess 27d to receive the protrusion 32 of the protrusion-type interlocked part 31A. The interlocking part 27c of the protrusion-type clip part 27B includes a protrusion 27e. The recess-type interlocked part 31B includes a recess 34 to receive the protrusion 27e of the protrusion-type clip part 27B.

According to the ultrasonic transducer device 1 of the eighth aspect in accordance with the present invention, in addition to the sixth or seventh aspect, the plurality of interlocked parts 31 are opposite each other while the housing 20 is between the plurality of interlocked parts 31.

According to the ultrasonic transducer device 1 of the ninth aspect in accordance with the present invention, in addition to any one of the first to eighth aspects, the housing 20 includes a part (hollow prism) 21b positioned inside the through hole 30b. The fixing member 3 holds the body unit 2 so that the part 21b of the housing 20 is not in contact with an internal side surface 30d of the through hole 30b.

According to the ultrasonic transducer device 1 of the tenth aspect in accordance with the present invention, in addition to any one of the first to ninth aspects, the at least one interlocked part 31 includes a stopper 31b to be in contact with the housing 20 to prevent a displacement of the housing 20.

According to the ultrasonic transducer device 1 of the eleventh aspect in accordance with the present invention, in addition to any one of the first to tenth aspects, at least one groove 30c is formed in a surface (face 35, 36) of the fixing plate 30.

The ultrasonic transducer device 1 of the twelfth aspect in accordance with the present invention, includes a body unit 2 and a holding member 4. The body unit 2 includes a housing 20 and at least one clip part 27. The housing 20 includes a space 28 which is in a front surface 21e of the housing 20 and is for receiving an ultrasonic transducer (transducer block) 23. The at least one clip part 27 is provided to a side surface 21f of the housing 20. The holding member 4 includes a flange 40 and at least one interlocked part 42. The flange 40 includes a rear surface 401 to be attached to a front surface 502 of an exterior panel 50 of a vehicle to be in a vicinity of an opening 51 in the exterior panel 50, and a through hole 41 to communicate to the opening 51. The at least one interlocked part 42 is provided to a part 402 of the rear surface 401 of the flange 40 exposed via the opening 51 and is removably connected to the at least one clip part 27 so that the space 28 faces the through hole 41. The at least one clip part 27 includes an interlocking part 27c and a spring part 27b. The interlocking part 27c is movable between a first position in which the interlocking part 27c is physically connected to the at least one interlocked part 42 and a second position in which the interlocking part 27c is not physically connected to the at least one interlocked part 42. The spring part 27b keeps the interlocking part 27c in the first position.

A method of attaching an ultrasonic transducer device 1 of the thirteenth aspect in accordance with the present invention, includes: preparing the ultrasonic transducer device 1 according to any one of the first to eleventh aspects; attaching the fixing member 3 of the ultrasonic transducer device 1 to a rear surface 501 of an external panel 50 of a vehicle in such a manner that the fixing surface 35 is in surface contact with the rear surface 501; aligning the through hole 30b of the fixing member 3 with the space 28, and the at least one interlocked part 31 with the at least one clip part 27; and moving the body unit 2 toward the fixing member 3 to connect the at least one interlocked part 31 to the at least one clip part 27.

The invention claimed is:

1. An ultrasonic transducer device, comprising:
   a body unit including:
     a housing including a space which is in a front surface of the housing and is for receiving an ultrasonic transducer, and
     at least one clip part provided to a side surface of the housing; and
   a fixing member including:
     a fixing plate including a fixing surface to be attached to a rear surface of an exterior panel of a vehicle, and a through hole to communicate to an opening in the exterior panel, and
     at least one interlocked part removably connected to the at least one clip part so that the space faces the through hole,
   the at least one clip part including:
     an interlocking part movable between a first position in which the interlocking part is physically connected to the at least one interlocked part and a second position in which the interlocking part is not physically connected to the at least one interlocked part, and
     a spring part keeping the interlocking part in the first position,
   the fixing plate having a shape of a rectangular plate,
   the fixing plate including a thick part at a center thereof in a longitudinal direction of the fixing plate,
   the thick part being greater in thickness than opposite sides of the fixing plate in the longitudinal direction, and
   the through hole being formed in the thick part,
   wherein the body unit includes a plurality of clip parts; and
   the fixing member includes a plurality of interlocked parts individually corresponding to the plurality of clip parts,
   the plurality of interlocked parts are columnar parts which protrude from a face on an opposite side of the fixing plate from the fixing surface, and protrude from opposite ends of the thick part in a width direction of the fixing plate.

2. The ultrasonic transducer device according to claim 1, wherein:
   the body unit includes a plurality of slots, each of which is between a corresponding one of the interlocking parts of the plurality of clip parts and the housing and is for receiving a corresponding one of the plurality of interlocked parts; and
   each of the interlocking parts is physically connected to a corresponding one of the plurality of interlocked parts when the corresponding one of the plurality of interlocked parts is inserted into a corresponding one of the plurality of slots.

3. The ultrasonic transducer device according to claim 1, wherein the spring part connects an end of the interlocking part far from the fixing plate to an end of the housing close to the fixing plate.

4. The ultrasonic transducer device according to claim 1, wherein:
   ones of the interlocking parts and the plurality of interlocked parts include a protrusion; and
   the others of the interlocking parts and the plurality of interlocked parts include a recess to receive the protrusion.

5. The ultrasonic transducer device according to claim 1, wherein:
   the plurality of clip parts include a recess-type clip part and a protrusion-type clip part that are on opposite sides of the housing;

the plurality of interlocked parts include a protrusion-type interlocked part and a recess-type interlocked part respectively corresponding to the recess-type clip part and the protrusion-type clip part;

the protrusion-type interlocked part includes a protrusion;

the interlocking part of the recess-type clip part includes a recess to receive the protrusion of the protrusion-type interlocked part;

the interlocking part of the protrusion-type clip part includes a protrusion; and the recess-type interlocked part includes a recess to receive the protrusion of the protrusion-type clip part.

6. The ultrasonic transducer device according to claim 1, wherein the plurality of interlocked parts are opposite each other while the housing is between the plurality of interlocked parts.

7. The ultrasonic transducer device according to of claim 1, wherein:

the housing includes a part positioned inside the through hole; and the fixing member holds the body unit so that the part of the housing is not in contact with an internal side surface of the through hole.

8. The ultrasonic transducer device according to claim 1, wherein each of the plurality of interlocked parts include a stopper to be in contact with the housing to prevent a displacement of the housing.

9. The ultrasonic transducer device according to claim 1, wherein at least one groove is formed in a surface of the fixing plate.

10. A method of attaching an ultrasonic transducer device, comprising:

preparing the ultrasonic transducer device according to claim 1;

attaching the fixing member of the ultrasonic transducer device to a rear surface of an external panel of a vehicle in such a manner that the fixing surface is in surface contact with the rear surface;

aligning the through hole of the fixing member with the space, and each of the plurality of interlocked parts with a corresponding one of the plurality of clip parts; and moving the body unit toward the fixing member to connect each of the plurality of interlocked parts to the corresponding one of the plurality of clip parts.

* * * * *